United States Patent
Kondo et al.

(10) Patent No.: US 10,632,669 B2
(45) Date of Patent: Apr. 28, 2020

(54) HELICAL LAYER STRUCTURE AND MANUFACTURING METHOD OF HELICAL LAYER STRUCTURE

(71) Applicants: Kasei Kogyo, Co., Ltd., Aichi (JP); HOWA Plastics. Co., Ltd., Aichi (JP)

(72) Inventors: Kazuo Kondo, Aichi (JP); Kazuya Kato, Aichi (JP); Hiroyuki Oe, Aichi (JP)

(73) Assignees: KASEI KOGYO, CO., LTD. (JP); HOWA PLASTICS. CO., LTD. (JP)

( * ) Notice: Subject to any disclaimer, the term of this patent is extended or adjusted under 35 U.S.C. 154(b) by 47 days.

(21) Appl. No.: 15/834,918

(22) Filed: Dec. 7, 2017

(65) Prior Publication Data

US 2018/0154414 A1 Jun. 7, 2018

(30) Foreign Application Priority Data

Dec. 7, 2016 (JP) ................................ 2016-237849

(51) Int. Cl.
*B32B 1/00* (2006.01)
*B32B 3/24* (2006.01)
(Continued)

(52) U.S. Cl.
CPC .............. *B29C 53/14* (2013.01); *B21D 11/14* (2013.01); *B29C 48/15* (2019.02); *B29C 53/005* (2013.01);
(Continued)

(58) Field of Classification Search
None
See application file for complete search history.

(56) References Cited

U.S. PATENT DOCUMENTS

| 1,961,744 | A | * | 6/1934 | Durkee | B21D 53/08 138/38 |
| 2,079,144 | A | * | 5/1937 | Appa | F28F 13/12 138/38 |

(Continued)

FOREIGN PATENT DOCUMENTS

| CN | 103350323 A | * 10/2013 | ................ F16F 1/02 |
| DE | 7229628 U | * 11/1973 | ............. B21D 11/14 |

(Continued)

OTHER PUBLICATIONS

Machine Translation of DE 7229628 U, Nov. 1973 (Year: 1973).*

(Continued)

*Primary Examiner* — Jeffrey A Vonch
(74) *Attorney, Agent, or Firm* — Bracewell LLP; Brad Y. Chin

(57) ABSTRACT

Embodiments provide a helical layer structure including: a helical core member which is formed of a flexible, lengthy, flat plate-like core member and which is formed of a steel plate made of a metal material, such as iron; and a polymeric coating layer which is formed of a polymeric material such as a thermosetting elastic material or a thermoplastic elastic material, and which coats the helical core member. The manufacturing method of the helical layer structure includes: a feeding step of feeding a core member having flexibility; a supply step of supplying the polymeric material having fluidity; a coating step of coating the core member with the polymeric material; a cooling step of cooling a coated intermediate which is coated with the polymeric material; and a helix formation step of helically twisting the coated intermediate to form the helical layer structure.

10 Claims, 4 Drawing Sheets

(51) Int. Cl.
| | |
|---|---|
| B32B 15/06 | (2006.01) |
| B32B 37/24 | (2006.01) |
| B32B 38/00 | (2006.01) |
| B29C 53/14 | (2006.01) |
| B21D 11/14 | (2006.01) |
| C09D 109/02 | (2006.01) |
| C09D 109/06 | (2006.01) |
| C09D 113/00 | (2006.01) |
| C09D 115/00 | (2006.01) |
| C09D 119/00 | (2006.01) |
| C09D 123/16 | (2006.01) |
| C09D 183/04 | (2006.01) |
| B29C 48/15 | (2019.01) |
| B29C 53/00 | (2006.01) |
| F28F 1/40 | (2006.01) |
| F28F 21/06 | (2006.01) |
| F28F 21/08 | (2006.01) |
| B21C 37/12 | (2006.01) |
| F16L 9/16 | (2006.01) |
| B29C 70/00 | (2006.01) |
| B32B 15/20 | (2006.01) |
| B32B 37/06 | (2006.01) |
| B32B 3/26 | (2006.01) |
| B32B 15/18 | (2006.01) |
| B32B 38/04 | (2006.01) |
| B21D 28/02 | (2006.01) |
| B21C 37/22 | (2006.01) |
| B05D 7/14 | (2006.01) |
| B05D 3/00 | (2006.01) |
| B05D 3/02 | (2006.01) |
| B29K 23/00 | (2006.01) |
| B29K 21/00 | (2006.01) |
| B29L 9/00 | (2006.01) |
| B29L 31/00 | (2006.01) |
| B29D 99/00 | (2010.01) |
| B29K 19/00 | (2006.01) |
| B32B 37/15 | (2006.01) |
| B29K 705/12 | (2006.01) |
| B29K 83/00 | (2006.01) |
| B29K 705/02 | (2006.01) |
| B29K 9/06 | (2006.01) |
| B29C 48/00 | (2019.01) |

(52) U.S. Cl.
CPC ............... *B32B 1/00* (2013.01); *B32B 15/06* (2013.01); *B32B 38/0012* (2013.01); *B05D 3/002* (2013.01); *B05D 3/02* (2013.01); *B05D 7/14* (2013.01); *B21C 37/123* (2013.01); *B21C 37/22* (2013.01); *B21D 28/02* (2013.01); *B29C 48/0019* (2019.02); *B29C 48/0022* (2019.02); *B29C 70/00* (2013.01); *B29D 99/0003* (2013.01); *B29K 2009/06* (2013.01); *B29K 2019/00* (2013.01); *B29K 2021/006* (2013.01); *B29K 2023/16* (2013.01); *B29K 2083/005* (2013.01); *B29K 2705/02* (2013.01); *B29K 2705/12* (2013.01); *B29L 2009/003* (2013.01); *B29L 2009/005* (2013.01); *B29L 2031/008* (2013.01); *B32B 3/266* (2013.01); *B32B 15/18* (2013.01); *B32B 15/20* (2013.01); *B32B 37/06* (2013.01); *B32B 37/153* (2013.01); *B32B 38/0004* (2013.01); *B32B 38/04* (2013.01); *B32B 2037/243* (2013.01); *B32B 2255/06* (2013.01); *B32B 2255/26* (2013.01); *B32B 2305/72* (2013.01); *B32B 2307/536* (2013.01); *B32B 2311/24* (2013.01); *B32B 2311/30* (2013.01); *B32B 2319/00* (2013.01); *B32B 2398/10* (2013.01); *C08L 2201/00* (2013.01); *C08L 2203/18* (2013.01); *C09D 109/02* (2013.01); *C09D 109/06* (2013.01); *C09D 113/00* (2013.01); *C09D 115/005* (2013.01); *C09D 119/00* (2013.01); *C09D 123/16* (2013.01); *C09D 183/04* (2013.01); *F16L 9/165* (2013.01); *F28F 1/40* (2013.01); *F28F 21/067* (2013.01); *F28F 21/08* (2013.01); *F28F 2215/00* (2013.01); *F28F 2255/08* (2013.01); *F28F 2255/12* (2013.01); *F28F 2255/146* (2013.01); *Y10S 72/00* (2013.01); *Y10T 29/4935* (2015.01); *Y10T 29/49377* (2015.01); *Y10T 29/49986* (2015.01); *Y10T 29/49993* (2015.01); *Y10T 29/49995* (2015.01); *Y10T 428/12361* (2015.01); *Y10T 428/24322* (2015.01); *Y10T 428/24347* (2015.01); *Y10T 428/31678* (2015.04); *Y10T 428/31696* (2015.04); *Y10T 428/31699* (2015.04)

(56) References Cited

U.S. PATENT DOCUMENTS

| | | | | |
|---|---|---|---|---|
| 3,128,536 | A * | 4/1964 | Eckhardt | B21D 53/04 228/145 |
| 3,222,908 | A * | 12/1965 | Molella | B21D 11/14 72/299 |
| 3,421,351 | A * | 1/1969 | Doran | B21D 11/14 72/64 |
| 3,455,018 | A * | 7/1969 | Collins | B60J 10/32 29/527.1 |
| 3,470,598 | A * | 10/1969 | Berthelsen | B29C 65/2076 29/897.312 |
| 3,936,278 | A * | 2/1976 | Moens | D07B 1/0606 428/592 |
| 3,941,866 | A * | 3/1976 | Ingraham | B05D 7/20 264/135 |
| 3,947,939 | A * | 4/1976 | Steiner | B21D 11/14 29/889.71 |
| 3,969,037 | A * | 7/1976 | Steiner | B01F 5/0614 416/176 |
| 4,117,064 | A * | 9/1978 | Mathe | B29C 53/14 264/103 |
| 4,188,424 | A * | 2/1980 | Ohno | E04C 5/06 428/572 |
| 4,395,862 | A * | 8/1983 | Jager | E06B 3/273 52/844 |
| 4,610,907 | A * | 9/1986 | Elvira | B60J 10/18 428/122 |
| 4,645,718 | A * | 2/1987 | Dambre | C25D 5/48 152/451 |
| 4,698,947 | A * | 10/1987 | McKay | E04B 2/8641 52/309.11 |
| 4,869,230 | A * | 9/1989 | Fletcher | F23C 3/002 126/91 A |
| 5,069,966 | A * | 12/1991 | Colaiacovo | B05D 7/14 252/396 |
| 5,199,142 | A * | 4/1993 | Davis | B21D 31/04 29/6.1 |
| 5,281,435 | A * | 1/1994 | Buecher | B05D 1/26 427/11 |
| 5,731,042 | A * | 3/1998 | Glende | B05D 7/16 427/195 |
| 5,891,579 | A * | 4/1999 | Glende | B05D 7/16 428/413 |
| 6,627,262 | B1 * | 9/2003 | Soas | B05C 1/083 118/202 |
| 7,494,696 | B1 * | 2/2009 | Wickland | A47B 83/02 427/435 |
| 2003/0017302 | A1 * | 1/2003 | Drozd | B32B 15/08 428/122 |

(56) References Cited

U.S. PATENT DOCUMENTS

| | | | | |
|---|---|---|---|---|
| 2003/0118739 A1* | 6/2003 | Li | ............................ | B05D 1/02 427/385.5 |
| 2003/0188850 A1* | 10/2003 | Liu | ................... | B01D 53/8675 165/109.1 |
| 2004/0026018 A1* | 2/2004 | Jozef | ......................... | B05C 1/14 156/230 |
| 2005/0193635 A1* | 9/2005 | Hemauer | .................. | B60J 10/18 49/490.1 |
| 2005/0228157 A1* | 10/2005 | Peterson | ................. | B32B 15/08 526/348.5 |
| 2008/0173396 A1* | 7/2008 | Wiessner | ................ | B32B 27/12 156/293 |
| 2009/0098345 A1* | 4/2009 | Brasher | ................... | B32B 3/266 428/173 |
| 2010/0183814 A1* | 7/2010 | Rios | .................. | E04F 15/02161 427/387 |
| 2013/0210997 A1* | 8/2013 | Kaune | ..................... | C08G 18/12 524/590 |
| 2015/0299445 A1* | 10/2015 | Cavalieri | ................. | F16L 9/14 525/240 |
| 2016/0108239 A1* | 4/2016 | Cree | ......................... | C08K 5/57 428/447 |
| 2017/0210894 A1* | 7/2017 | Galvan | ..................... | B32B 7/12 |

FOREIGN PATENT DOCUMENTS

| | | | | |
|---|---|---|---|---|
| DE | 2421519 A1 * | 11/1975 | .............. | F28F 13/12 |
| DE | 2421550 A1 * | 11/1975 | ............. | B21D 53/02 |
| DE | 2430584 A1 * | 1/1976 | ................ | F28F 13/12 |
| DE | 8700361 U1 * | 7/1987 | ................. | F16F 1/02 |
| DE | 19729725 A1 * | 1/1999 | ............. | B21D 11/15 |
| EP | 0011175 A1 * | 5/1980 | ............. | B21D 11/14 |
| EP | 0078485 A1 * | 5/1983 | ............. | B21D 11/14 |
| EP | 0184544 A1 * | 6/1986 | ............. | B29C 53/14 |
| EP | 0402024 A2 * | 12/1990 | ............. | B21D 11/14 |
| EP | 0581820 B1 * | 6/1997 | ......... | B29C 37/0085 |
| FR | 2235344 A1 * | 1/1975 | ................ | F28F 13/12 |
| FR | 2404511 A1 * | 4/1979 | ........... | B29C 48/301 |
| FR | 2659730 A1 * | 9/1991 | ................ | F28F 13/12 |
| GB | 1028000 A * | 5/1966 | ............. | B21C 37/22 |
| GB | 2304772 A * | 3/1997 | .............. | B60J 10/18 |
| JP | 62207516 A * | 9/1987 | .............. | F28F 13/12 |
| JP | 3023583 B | 1/2000 | | |
| JP | 2000117324 A * | 4/2000 | | |
| JP | 2014014837 A | 1/2014 | | |
| NL | 7901194 A * | 8/1980 | ............. | B21D 11/15 |
| WO | WO-8501691 A1 * | 4/1985 | ............. | F28F 13/12 |

OTHER PUBLICATIONS

Machine Translation of DE 2421519 A1, Nov. 1975 (Year: 1975).*
Machine Translation of EP 11175 A1, May 1980 (Year: 1980).*
Machine Translation of FR 2659730 A1, Sep. 1991 (Year: 1991).*
English Abstract for DE 3566924 D1, Jan. 1989 (Year: 1989).*

* cited by examiner

HELICAL LAYER STRUCTURE AND MANUFACTURING METHOD OF HELICAL LAYER STRUCTURE

CROSS REFERENCE TO RELATED APPLICATIONS

This application claims the benefit of and priority to Japanese Patent Application No. JP-2016-237849, filed on Dec. 7, 2016, entitled (translation), "HELICAL LAYER STRUCTURE AND MANUFACTURING METHOD OF HELICAL LAYER STRUCTURE," which is hereby incorporated by reference in its entirety into this application.

BACKGROUND

Field

Embodiments relate to a helical layer structure and a manufacturing method of a helical layer structure. More specifically, embodiments relate to a helical layer structure formed of a layered structure of a minimum of two or more layers, and a manufacturing method of a helical layer structure.

Description of the Related Art

Hitherto, members, products and the like having helical (spiral or twisted) structures have been manufactured, and used in a variety of applications. For example, twisted square pipes, twisted steel plates and the like formed by twisting square pipes or steel plates shaped like flat plates (flat steel plates) are used as ornamental members to be installed in gardens, buildings and the like (see, for example, Japanese Patent No. 3023583).

Further, so-called helical piles are used as the foundation reinforcement materials for buildings or walls (see, for example, Japanese Patent Application No. JP-A-2014-14837). To manufacture the helical piles, flat steel plates are twisted to form helical members, which are then cut to predetermined lengths, and one end of each of the cut helical members, which is to be inserted in the ground, is formed into a pile shape. The helically twisted shape permits increased strength against a pressure applied from a predetermined direction.

Meanwhile, other helical products and the like are used as, for example, the screws for feeding objects in predetermined directions, or as a part of rectification members, which make use of their helical configurations to straighten the flow of a gas or a liquid, or used as a part of heat exchanging members by making use of their characteristic of a larger area per unit volume.

SUMMARY

Many of the conventional helical products and the like are composed primarily of metal materials and have been required to maintain the helical forms due to the purpose of use and applications, such as reinforcement. This means that, when a high stress is applied to the products and the like, the helical forms (especially the forms in the direction of the screw axis) do not change. In other words, the conventional helical products have low flexibility and cannot be freely deformed into any other shapes.

Therefore, when used as a part of a rectification member or a heat exchanging member, which is an application other than the reinforcement, the handling of the conventional helical products has been difficult, thus making it difficult, for example, to install the helical products to pipes or piping that has an intricately bent shape. This has been leading, in some cases, to lower work efficiency typically represented by a longer time required to finish the work.

In addition, the foregoing helical products and the like are produced simply by twisting square pipes, flat steel plates or the like, or by installing helical blades to linear metal bars by welding or the like. Hence, the metal materials, such as iron or stainless steel, are directly exposed on the surfaces of the products. As a result, the helical products and the like, which are directly exposed to open air, are likely to come in contact with the oxygen in the air, rainwater and the like. This has been leading to a high possibility of problems, such as the occurrence of rust or corrosion on the surfaces of the products over prolonged use.

Hence, there has been the challenge of limited use in outdoor environments or the likes. Further, when used as a part of, for example, a rectification member or a heat exchanging member, there have been some cases where the helical products cannot be used in an environment involving the possibility of contact with strong acid, strong alkali or corrosive gases or liquids. As a result, there have been some cases where the characteristics of the helical structures cannot be fully utilized, thus significantly limiting the use environments.

Accordingly, in view of the circumstances described above, embodiments provide a helical layer structure which has flexibility that enables deformation into any shape, suppresses the occurrence of rust, corrosion and the like, maintains durability over a long period of time, and which does not have limited use environments or the like, and a manufacturing method of the helical layer structure.

Furthermore, embodiments provide a helical layer structure that solves the problems described above, and a manufacturing method of the helical layer structure.

According to at least one embodiment, there is provided a helical layer structure including: a helical core member which is formed of a flexible, lengthy, flat plate-like core member and which has a helical shape, the longitudinal direction of the core member being a helix axis; and a polymeric coating layer which is formed of a polymeric material and which covers the entire surface of the helical core member.

According to at least one embodiment, the helical core member is a steel plate formed of a metal material which is any one of iron, stainless steel and aluminum.

According to at least one embodiment, the helical core member has at least one of a slit that passes through a core member front surface and a core member back surface of the core member and a slit formed by cutting out a part of the core member.

According to at least one embodiment, the core member thickness of the helical core member or the core member ranges from 0.25 mm to 3.00 mm, and the core member width of the helical core member or the core member ranges from 3 mm to 150 mm.

According to at least one embodiment, the layer thickness of the polymeric coating layer ranges from 0.3 mm to 10 mm.

According to at least one embodiment, the polymeric material that constitutes the polymeric coating layer is a thermosetting elastic material which is any one of ethylene-propylene rubber, styrene-butadiene rubber, nitrile rubber, silicone rubber, acrylic rubber, and hydrogenated nitrile rubber.

According to at least one embodiment, the polymeric material constituting the polymeric coating layer is a thermoplastic elastic material which is any one of an olefin-based thermoplastic elastomer, a styrene-based thermoplastic elastomer, a urethane-based thermoplastic elastomer, a dynamically cross-linked thermoplastic elastomer, an amide-based thermoplastic elastomer, and an ester-based thermoplastic elastomer.

According to at least one embodiment, the polymeric coating layer has a Shore A hardness ranging from 35 to 95.

According to another embodiment, there is provided a manufacturing method of a helical layer structure, in which the method includes a feeding step of feeding a flexible, lengthy, flat plate-like core member along the longitudinal direction of the core member; a supply step of supplying a polymeric material having fluidity to a coating area provided in the middle of a feeding route of the core member; a coating step of bringing the polymeric material supplied in the supply step into contact with the core member to coat the core member with the polymeric material in the coating area; a cooling step of cooling a coated intermediate which is the core member coated with the polymeric material; and a helix formation step of helically twisting the coated intermediate, the longitudinal direction of the coated intermediate that has passed through the cooling step being a helix axis, thereby to form a helical layer structure.

According to at least one embodiment, the method further includes: an intermediate holding step which is carried out between the cooling step and the helix formation step to temporarily hold, in a buffer area, the coated intermediate that has passed through the cooling step; and an after-twist cutting step of cutting an uncut helical layer structure that has passed through the helix formation step to a predetermined length, wherein the helix formation step helically twists the coated intermediate before the coated intermediate is cut to a predetermined length.

According to at least one embodiment, the method further includes: a pre-twist cutting step which is carried out between the cooling step and the helix formation step to cut the coated intermediate that has passed through the cooling step to a predetermined length, wherein the helix formation step helically twists the coated intermediate that has been cut to a predetermined length.

According to at least one embodiment, the polymeric material supplied in the supply step is a thermosetting elastic material which is any one of ethylene-propylene rubber, styrene-butadiene rubber, nitrile rubber, silicone rubber, acrylic rubber, and hydrogenated nitrile rubber, and the manufacturing method further includes a thermosetting step which is carried out between the coating step and the cooling step to heat the coated intermediate thereby to thermally cure the polymeric material coated on the core member.

According to at least one embodiment, the supply step supplies the polymeric material which is subjected to a heating treatment at a temperature in the range of 30° C. to 120° C. to develop fluidity, and the thermosetting step performs a thermosetting treatment at a thermosetting temperature in the range of 150° C. to 250° C. for a thermosetting time of 120 s to 600 s.

According to at least one embodiment, the polymeric material supplied in the supply step is a thermoplastic elastic material which is any one of an olefin-based thermoplastic elastomer, a styrene-based thermoplastic elastomer, a urethane-based thermoplastic elastomer, a dynamically cross-linked thermoplastic elastomer, an amide-based thermoplastic elastomer, and an ester-based thermoplastic elastomer, and the supply step supplies the polymeric material which is subjected to a heat treatment at a temperature in the range of 150° C. to 270° C. to develop fluidity.

According to at least one embodiment, the helical layer structure is composed of a layered structure, in which the entire surface of the core member composed of a metal material is coated with the polymeric coating layer, and the core member is formed of a flexible material. This enables the helical layer structure to be freely deformed in response to a stress, permitting greater ease of handling and higher work efficiency.

According to at least one embodiment, the polymeric coating layer is composed of a polymeric material, such as a thermosetting elastic material (rubber) or a thermoplastic elastic material (elastomer), which covers the entire surface of the helical core member protects the helical core member from direct exposure to the atmosphere or the like. This enables the helical layer structure to exhibit high durability, prolonged service life, and minimized restrictions on use environments.

According to at least one embodiment, a lengthy flat plate-like core member is coated with a polymeric material and then helically twisted, thereby making it possible to efficiently manufacture a helical layer structure capable of providing the outstanding advantages described above.

DETAILED DESCRIPTION

The following will describe in detail, with reference to the accompanying drawings, the embodiments of a helical layer structure and a manufacturing method of the helical layer structure in accordance with the invention. The helical layer structure and the manufacturing method of the helical layer structure according to various embodiments are not limited to the embodiments described below, and various design changes, modifications, improvements and the like can be added within a range that does not deviate from the spirit of the invention.

1. Helical Layer Structure

Figure 1:
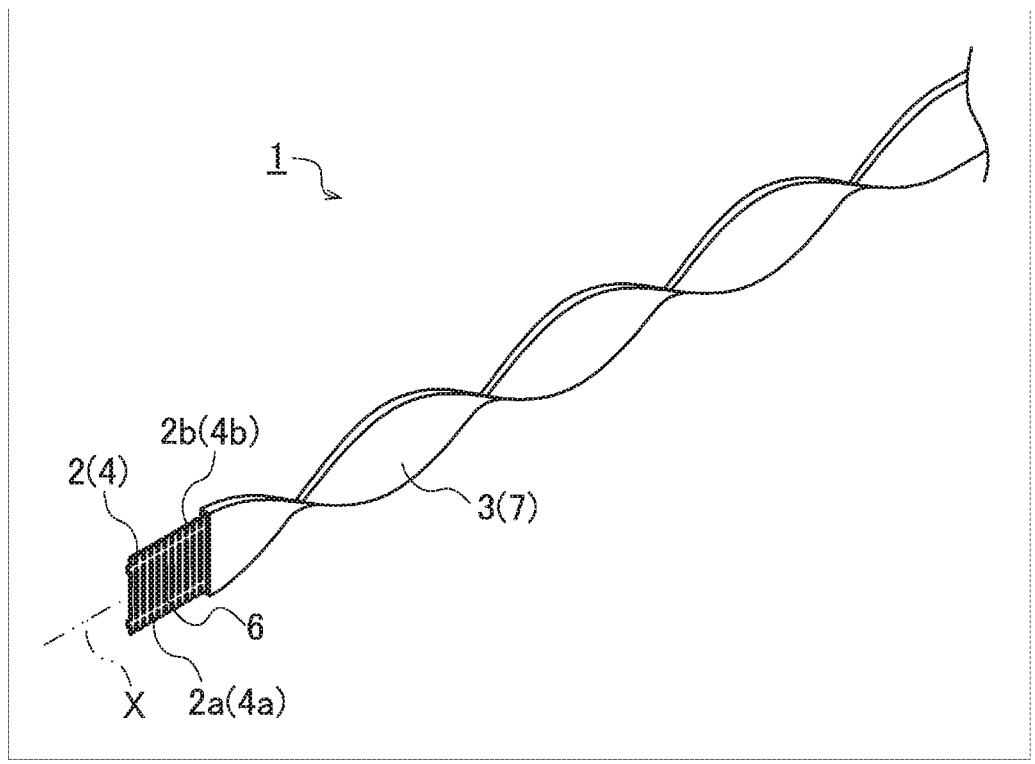
FIG. 1 is a perspective view schematically showing the simplified configuration of a helical layer structure according to an embodiment.
Figure 2:
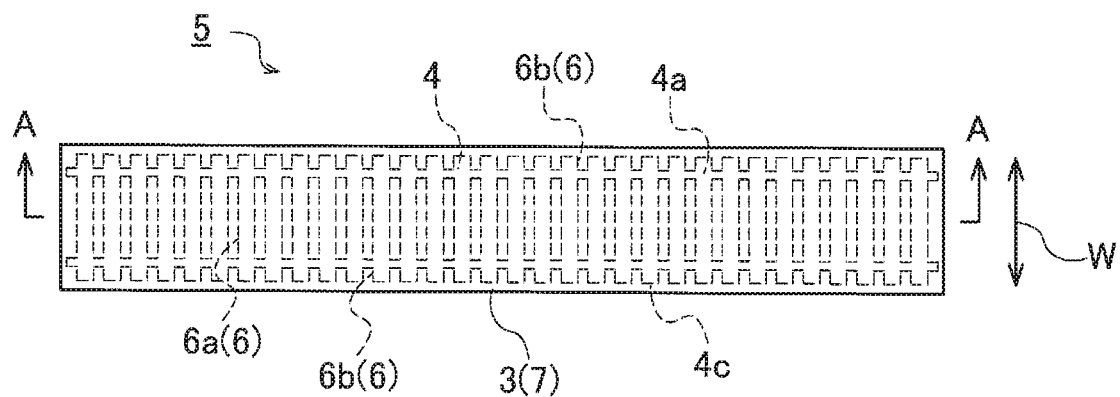
FIG. 2 is a plan view showing the schematic configuration of a coated intermediate before a twisting step.
Figure 3:
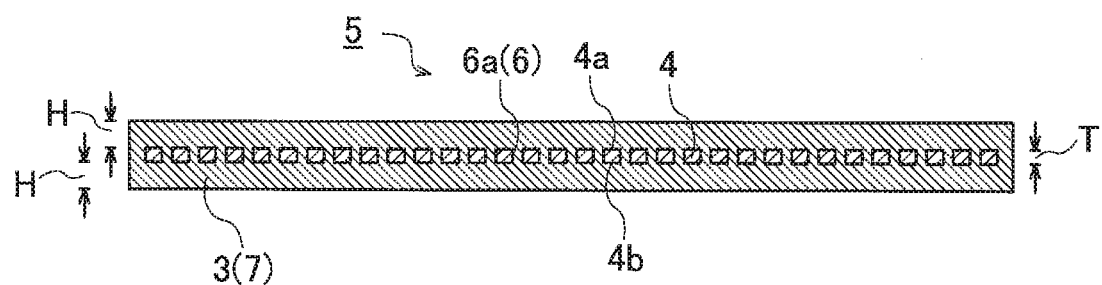
FIG. 3 is a sectional view taken along line A-A of FIG. 2, showing the schematic configuration of the coated intermediate before the twisting step.

A helical layer structure 1 according to an embodiment is a layered structure composed of at least two layers, and includes a helical core member 2 shaped like a helix, and a polymeric coating layer 3 having the entire surface of the helical core member 2 coated with a polymeric material 7, as shown mainly in FIGS. 1 to 5. In order to explain the configuration of the helical layer structure 1, FIG. 1 shows the state of the helical layer structure 1 with a core member 4 exposed, the state being a part of one end is helically twisted. FIG. 2 and FIG. 3 show the configuration of a coated intermediate 5, in which the polymeric coating layer 3 is provided on the entire surface of the core member 4 before the helical layer structure 1 is twisted.

The configuration of the helical layer structure 1 will be described in further detail. The helical core member 2 is formed of the core member 4, which has flexibility and which is shaped like a lengthy flat plate or a lengthy sheet, and is helically twisted at regular intervals of predetermined pitches or the like.

According to at least one embodiment, the helical core member 2 and the core member 4 constituting the helical core member 2 are primarily formed of a flat steel plate or a rolled steel plate made of a metal material, such as iron, stainless steel, aluminum or the like. The longitudinal direction of the core member 4 described above coincides with the longitudinal direction of the helical core member 2 and the helical layer structure 1, and coincides with a helix axis X of the helical layer structure 1 (refer to the two-dot chain line in FIG. 1).

In the helical layer structure 1 according to at least one embodiment, the core member 4 has flexibility and is formed using a metal material, such as a flat-rolled steel plate, thus permitting easy helical twisting by using a well-known twisting device (not shown). In the twisting device, for example, one end and the other end of the lengthy core member 4 are fixed (chucked), and then only the other end of the core member 4 is rotated in a predetermined direction, thereby creating the helical form along the helix axis X (refer to FIG. 1), which coincides with the longitudinal direction of the core member 4. The actual twisting process is performed after the polymeric material 7 is coated on the core member 4 to form the polymeric coating layer 3 (more details will be given hereinafter).

According to at least one embodiment, the helical core member 2 is formed of the core member 4 made of a metal material, so that the helical core member 2 that has been twisted can maintain the helical form unless subjected to an especially high stress. However, the helical core member 2 and the core member 4 have a certain level of flexibility that enables their form to be deformed by, for example, applying a stress by a force applied by a human hand or the like in a direction for bending the helix axis X.

In order for the helical core member 2 or the core member 4 (hereinafter referred to simply as "the helical core member 2 or the like" to have the properties of the flexibility as described above, it is necessary to use a metal material, such as iron, stainless steel or aluminum, as the main raw material and to set a core member thickness T and a core member width W of the helical core member 2 or the like to predetermined ranges.

More specifically, the core member thickness T (refer to FIG. 3) of the helical core member 2 or the like is set to the range of 0.25 mm to 3.0 mm in the helical layer structure 1 according to at least one embodiment. Setting the core member thickness T to the foregoing range makes it possible to maintain the helical forms after the twisting process and to permit easy deformation when a stress is applied.

In addition, the core member width W (refer to FIG. 2) of the helical core member 2 or the like is set to the range of 3 mm to 150 mm in the helical layer structure 1 according to at least one embodiment. Setting the core member width W to the foregoing range also makes it possible to maintain the helical form after the twisting process and to permit easy deformation when a stress is applied.

If the core member thickness T is less than 0.25 mm, then the helical core member 2 constituting the basic skeleton that maintains the helical form of the helical layer structure 1 will not be sufficiently strong. As a result, the helical form may not be satisfactorily maintained due to the self-weight, the weight of the polymeric coating layer 3, the gravity and the like. Further, the helical core member 2 or the like may be broken or cut due to an insufficient strength when subjected to the helical twisting process.

Meanwhile, if the core member thickness T is larger than 3.00 mm, then a larger force (load) will be required to helically twist the core member 4. This is likely to result in deteriorated workability in the twisting process and a greater force will be required to apply a stress to deform the helical shape. In other words, the flexibility will deteriorate.

Further, if the core member width W is set to be less than 3 mm, then a resulting helical form will be too small, preventing the advantage provided by using the helical form from being fully exhibited. On the other hand, if the core member width W is set to be larger than 150 mm, then poor flexibility will result, leading to a possibility of impaired twistability or deformability into a desired shape. In addition, the coating width of the core member 4 will be larger, inevitably requiring a larger device (refer to a coating head 13 in FIG. 7) for forming the polymeric coating layer 3 covering the core member 4. This may increase the equipment cost for the coating head 13. Thus, the core member thickness T and the core member width W are set to the ranges specified according to various embodiments.

According to at least one embodiment, the helical core member 2 or the like of the helical layer structure 1 includes a plurality of slits 6 which pass through core member front surfaces 2a, 4a and core member back surfaces 2b, 4b of the helical core member 2 or the like, or which are cutouts of a part of the helical core member 2 or the like, as shown mainly in FIGS. 1 to 3. The slits 6 are voids produced by removing a part of the helical core member 2 or the like having a substantially flat plate shape, the voids being actually provided in the core member 4 before subjected to the helical twisting process. There is no particular restriction on the shape or layout of the slits 6 and on the form of the helical core member 2 or the like after the slits 6 are formed.

For example, as shown in FIGS. 1 to 3, a plurality of slits 6a and 6b, which are substantially rectangular, may be provided at the central portion and the portions on both sides of the helical core member 2 or the like such that the entire helical core member 2 or the like looks substantially like hash marks (#). The slits 6a at the central portion are formed, passing through the core member front surfaces 2a, 4a and the core member back surfaces 2b, 4b, while the pairs of slits 6b in the portions on both sides are formed by matching and cutting out core member side surfaces 4c.

Figure 4:
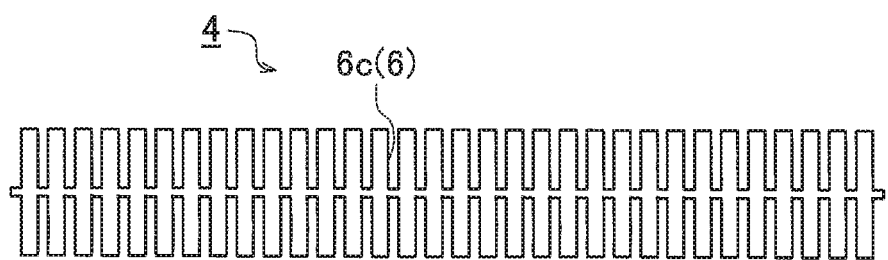
FIG. 4 is a plan view showing another example configuration of slits of a core member before the twisting step.
Figure 5:
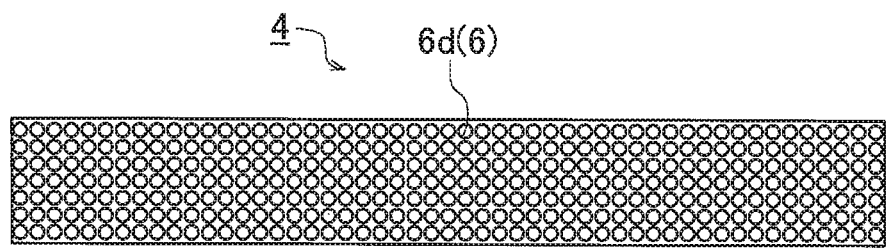
FIG. 5 is a plan view showing yet another example configuration of the slits of a core member before the twisting step.

Further, a substantially fishbone-like configuration may be adopted, in which pairs of substantially rectangular parallelepiped slits 6c are provided at the portions on both sides of the helical core member 2 or the like, leaving the central portion of the helical core member 2 or the like to be linear (refer to FIG. 4). In this case, the pairs of slits 6c are formed by matching and cutting out the core member side surfaces 4c.

According to at least one embodiment, the slits 6 can be interpreted in a broad sense in the present disclosure. For example, the slits 6 may be interpreted to include a plurality of punched parts 6d (so-called punched holes), which are formed by punching holes in the core member front surfaces 2*a*, 4*a* and the core member back surfaces 2*b*, 4*b* at regular intervals (refer to FIG. 5). Further, the foregoing plurality of slits 6*a*, 6*b*, 6*c* or the foregoing punched parts 6*d*, which are a part of the slits 6, may be arranged in various combinations.

In addition, although the slits 6*a* and the like and the punched parts 6*d* mentioned above are passed through the core member front surfaces 2*a*, 4*a* and the core member back surfaces 2*b*, 4*b*, these slits and the punched parts do not have to be necessarily passed through, and may alternatively include hollowed parts (not shown) formed by hollowing out a part of the core member front surface 2*a* or the like. The slits 6 can be formed by a well-known metalworking technique, such as punching or laser machining.

As described above, the plurality of slits 6 provided in the helical core member 2 or the like enable the helical core member 2 or the like to be further flexible. In addition, the level of flexibility can be adjusted by the shape or the layout of the slits 6, thus making it possible to create the helical layer structure 1 which can maintain the helical form and which can be appropriately deformed by a stress. This permits improved workability for installation to a place having a complicated shape.

Further, the foregoing slits 6 provided in the helical core member 2 or the like permit enhanced close contact or adhesion with the polymeric coating layer 3 (which will be described in detail hereinafter). When the polymeric material 7 is brought into contact with the entire surface of the core member 4 provided with the slits 6 so as to form the polymeric coating layer 3, a part of the polymeric material 7 fills in the slits 6, which are the voids provided in the core member 4 (refer to, for example, FIG. 3).

Thus, even if a force that could cause only the helical core member 2 to slip off of the helical layer structure 1, the polymeric coating layer 3 filling in the slits 6 will prevent the slipping off. This enables the helical layer structure 1 to stably maintain the layered structure of the two layers, namely, the helical core member 2 and the polymeric coating layer 3.

Meanwhile, the polymeric coating layer 3 in the helical layer structure 1 according to at least one embodiment is formed by bringing the polymeric material 7, which has fluidity, into contact with the entire surface of the helical core member 2 or the like and then subjecting the polymeric material 7 to thermosetting or cooling. Thus, the helical core member 2 or the like made of a metal material is completely covered with the polymeric coating layer 3, preventing direct exposure to the atmosphere or the like.

According to at least one embodiment, the polymeric coating layer 3 covering the helical core member 2 is not limited to the single layer, as shown in FIG. 1 and FIG. 3, and may alternatively be composed of a plurality of layers. Therefore, the helical layer structure 1 in accordance with at least one embodiment may have a layered structure composed of at least two layers, namely, the helical core member 2 or the like and the polymeric coating layer 3, and may have a multilayer structure composed of more than two layers.

According to at least one embodiment, the polymeric material 7, which has elasticity, is used for the polymeric coating layer 3 (which will be discussed in detail hereinafter). Hence, when the core member 4 is twisted into the helical core member 2 or when a stress is applied to the helical layer structure 1 to deform the helical layer structure 1, the polymeric coating layer 3 can be expanded or contracted at the time of bending or processing. This leads to a minimized possibility of the polymeric coating layer 3 developing a crack, cleavage or the like in the surface thereof.

According to at least one embodiment, a layer thickness H of the polymeric coating layer 3 is set to the range of 0.3 mm to 10 mm from the core member front surfaces 2*a*, 4*a* and the core member back surfaces 2*b*, 4*b* of the helical core member 2 or the like, and a core member side surfaces (not shown). If the layer thickness H is thinner than 0.3 mm, then it would be difficult to cover the core member 4 to an even layer thickness H, posing a problem, such as the direct exposure of the helical core member 2 or the like to external air or the like.

On the other hand, if the layer thickness H is more than 10 mm, then it is highly likely that, when the core member 4 is helically twisted or the helical layer structure 1 is deformed, the polymeric coating layer 3 that is thick will interfere with processing or deformation. Further, after the twisting process, the resilience of the polymeric coating layer 3 formed of an elastic material is high, so that the helical form may not be maintained, leading to disturbed pitches or damaged form. For this reason, the layer thickness H of the polymeric coating layer 3 is restricted to be within the foregoing numerical range.

According to at least one embodiment, the polymeric material 7 used for the polymeric coating layer 3 may be a thermosetting elastic material, which is any one of, for example, ethylene-propylene rubber (EPDM), styrene-butadiene rubber (SBR), nitrile rubber (NBR), silicone rubber (VMQ), acrylic rubber (ACM), and hydrogenated nitrile rubber (HNBR). In particular, the ethylene-propylene rubber is ideally used.

Further, as the polymeric material 7, a thermoplastic elastic material, which is any one of an olefin-based thermoplastic elastomer (TPO), a styrene-based thermoplastic elastomer (TPE), a urethane-based thermoplastic elastomer (TPU), a dynamically cross-linked thermoplastic elastomer (TPV), an amide-based thermoplastic elastomer (TPA), and an ester-based thermoplastic elastomer (TPC) can be used. In particular, the olefin-based thermoplastic elastomer, the dynamically cross-linked thermoplastic elastomer, or the styrene-based thermoplastic elastomer is ideally used.

As described above, the polymeric coating layer 3 can be formed using the polymeric material 7 (a resin material in a broad sense), such as a rubber, which is a thermosetting elastic material that can be elastically deformed in response to a stress, or an elastomer, which is a thermoplastic elastic material.

Further, the polymeric coating layer 3 used for the helical layer structure 1 according to at least embodiment exhibits shore A hardness ranging from 35 to 95. The Shore A hardness is a standard for measuring the hardness of rubber (elastic member). An indenter (push needle) is indented to the surface of an object to be measured so as to deform the object to be measured, thereby measuring the amount of deformation (or the indentation depth).

More specifically, based on JIS K6253, the hardness is measured using a durometer (a spring type rubber hardness meter). Setting the shore A hardness to the range of 35 to 95 prevents adversely affecting the workability in the twisting process or the deformability of the helical layer structure 1 and also prevents a problem, such as cracking, in the polymeric coating layer 3.

2. Manufacturing Method of the Helical Layer Structure

A manufacturing method 10 of the helical layer structure according to at least one embodiment (hereinafter referred to simply as "the manufacturing method 10") includes: a feeding step S1 of feeding the core member 4; a supply step S2 of supplying the polymeric material 7; a coating step S3 of coating the core member 4 with the polymeric material 7; a thermosetting step S4 of heating the coated intermediate 5 at a predetermined thermosetting temperature to perform a thermosetting treatment; a cooling step S5 of cooling the coated intermediate 5 after the thermosetting treatment; an intermediate holding step S6 of temporarily holding, in a buffer area B, the coated intermediate 5 that has been cooled; a helix formation step S7 of winding out a part of the coated intermediate 5 retained in the buffer area B and then performing helical twisting; and a post-twist cutting step S8 of cutting an uncut helical layer structure 1a that has been twisted to a predetermined length. The following will describe a case where a thermosetting elastic material, such as ethylene-propylene rubber, is used as the polymeric material.

According to at least one embodiment, the manufacturing method 10 successively carries out the process from the feeding step S1 of pulling out the core member 4, which is shaped like a lengthy flat plate, and feeding the core member 4 along the longitudinal direction of the helix formation step S7 of the helical twisting process. More specifically, up to the helix formation step S7, the core member 4, the coated intermediate 5, and the uncut helical layer structure 1a (refer to FIG. 6) are connected in one piece, and then cut into the helical layer structure 1 of a predetermined length after the helix formation step S7.

The manufacturing method 10 will be described in further detail. The core member 4, which is made of a flexible metal material and which is lengthy and flat plate-like, is set on an unwinding device (not shown) as a rolled body 11, which has been wound up in a roll beforehand, and the core member 4 is pulled out along a substantially horizontal direction (in the lateral direction of the paper surface in FIG. 6) so as to be carried along a feeding direction F (the feeding step S1).

According to at least one embodiment, the feeding speed of the core member 4, i.e. the delivery speed from the rolled body 11, is not restricted in particular, but may be set to, for example, the range of 2 m/min to 30 m/min. Thus, in a coating step S3, which will be discussed hereinafter, the polymeric material 7 in an appropriate amount can be brought in contact with the core member 4 to cover the core member 4 and the manufacturing efficiency can be improved.

A steel sheet of a metal material, such as iron, as described above can be used for the core member 4. For example, a cold-rolled steel sheet, which uses iron as the primary raw material and which has the core member thickness T of 0.5 mm and the core member width W of 25 mm, may be used. Further, the core member 4 is provided beforehand with the plurality of slits 6 by punching, laser machining or the like such that the whole core member 4 looks substantially like hash marks "#" (refer to FIG. 2).

Meanwhile, the polymeric material 7 made of a thermosetting elastic material is subjected to a heat treatment in advance at a predetermined temperature (e.g. 30° C. to 120° C.) so as to develop the state of fluidity. In this case, if the temperature is below 30° C., then the fluidity is lost, making it difficult to supply (discharge) the polymeric material 7 toward a feeding route R of the core member 4. On the other hand, if the temperature exceeds 120° C., then the hardening reaction of the polymeric material 7 (rubber), which is a thermosetting elastic material, may inconveniently proceed. For this reason, the temperature for imparting the fluidity to the polymeric material 7 is restricted to the foregoing numerical range.

Other components than the foregoing ethylene-propylene rubber (EPDM) can be mixed in the polymeric material 7. For example, various materials, including a filler, such as carbon, calcium carbonate or the like, oil, and a vulcanizing agent can be added at various mixing ratios. This makes it possible to adjust the fluidity, the adhesion to the core member 4, and the elasticity of the polymeric coating layer 3.

According to at least one embodiment, the polymeric material 7 that has been heated to develop fluidity is supplied from a supply unit 12 under a predetermined pressure to the feeding route R of the core member 4 while being kneaded (the supply step S2). The coating head 13 connected to the supply unit 12 is installed in a coating area C provided in the middle of the feeding route R. The passage through the coating head 13 causes the core member 4 and the polymeric material 7 to be brought into contact with each other. Then, the core member 4 and the polymeric material 7 are pushed together out of the coating head 13 through a die 14 provided on the coating head 13.

Figure 7:
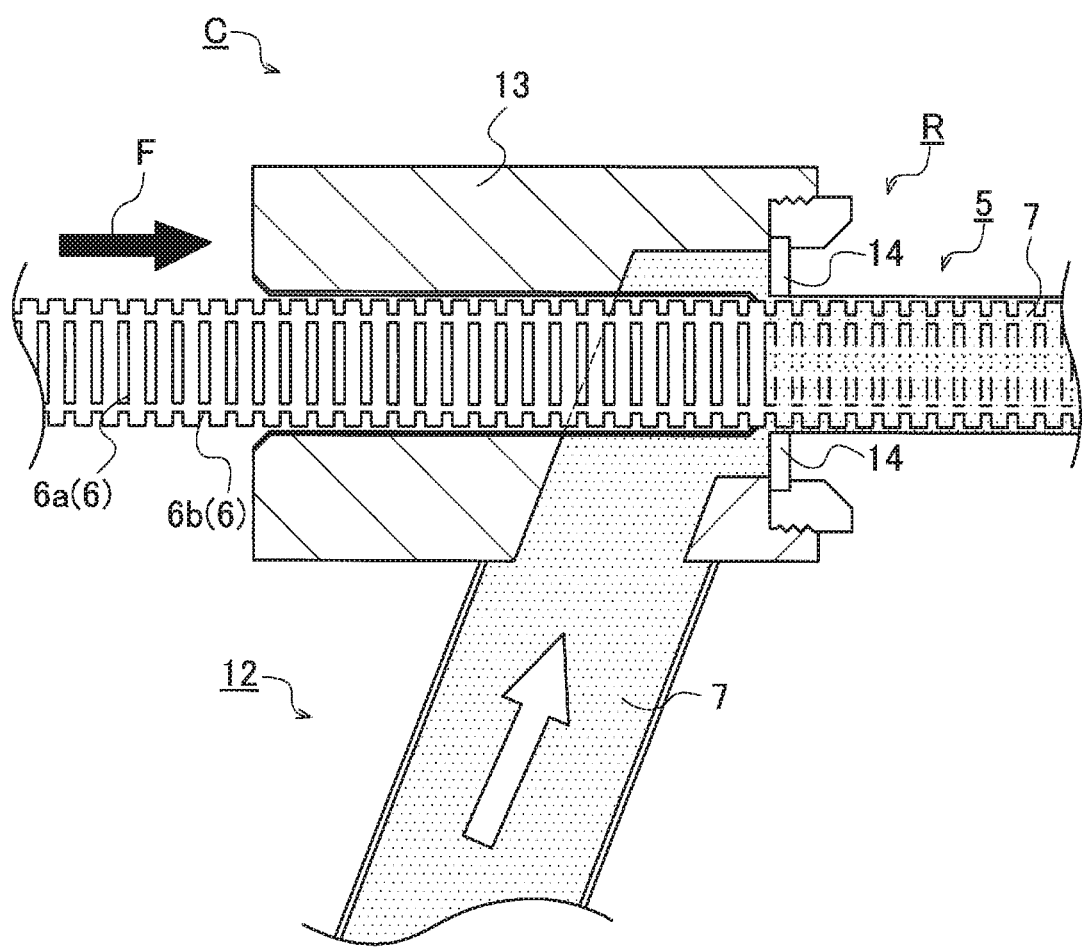
FIG. 7 is a schematic sectional view showing the simplified configuration of a coating head installed in a coating area.

Thus, the core member 4 and the polymeric material 7 are brought into contact with each other, and the polymeric material 7 adheres to the entire surface of the core member 4 so as to coat the core member 4 (the coating step S3). FIG. 7 is a schematic sectional view showing the simplified configuration of the coating head 13. The discharge amount of the polymeric material 7 through the die 14 or the core member width W of the core member 4 that is applicable can be changed by changing the shape of the coating head 13 or the shape of the die 14 of the coating head 13. As a result, the layer thickness H of the polymeric coating layer 3 can be eventually adjusted. In the manufacturing method 10 according to at least embodiment, the layer thickness H of the polymeric coating layer 3 after the core member 4 is coated and the polymeric coating layer 3 is subjected to the thermosetting step S4 and the cooling step S5 is set such that the final layer thickness H will be 1.0 mm.

According to at least one embodiment, the coated intermediate 5, which has the polymeric material 7 adhering to the core member 4 and the polymeric material 7 that has not yet hardened, is fed to a thermosetting unit 15, which has a hardening furnace (not shown) adjusted to a thermosetting temperature that is higher than a temperature for obtaining the fluidity of the polymeric material 7 (the thermosetting step S4). In this case, the thermosetting temperature is set to the range of 150° C. to 250° C., and the time required for the passage through the hardening furnace of the thermosetting unit 15 (thermosetting time) is set to the range of 120 s to 600 s.

According to at least one embodiment, the curing reaction of the polymeric material 7 used in the manufacturing method 10 is expedited by the thermosetting treatment at a high thermosetting temperature in the range of 150° C. to 250° C. as described above. As a result, the polymeric material 7 loses its fluidity and constitutes the polymeric coating layer 3 having the elasticity. The coated intermediate 5 that has been subjected to the thermosetting step S4 is carried to the next step, namely, the cooling step S5, so as to be passed through a refrigerant (e.g. water). This lowers the temperature of the coated intermediate 5, completing the formation of the polymeric coating layer 3 having the elasticity (the cooling step S5).

Figure 6:
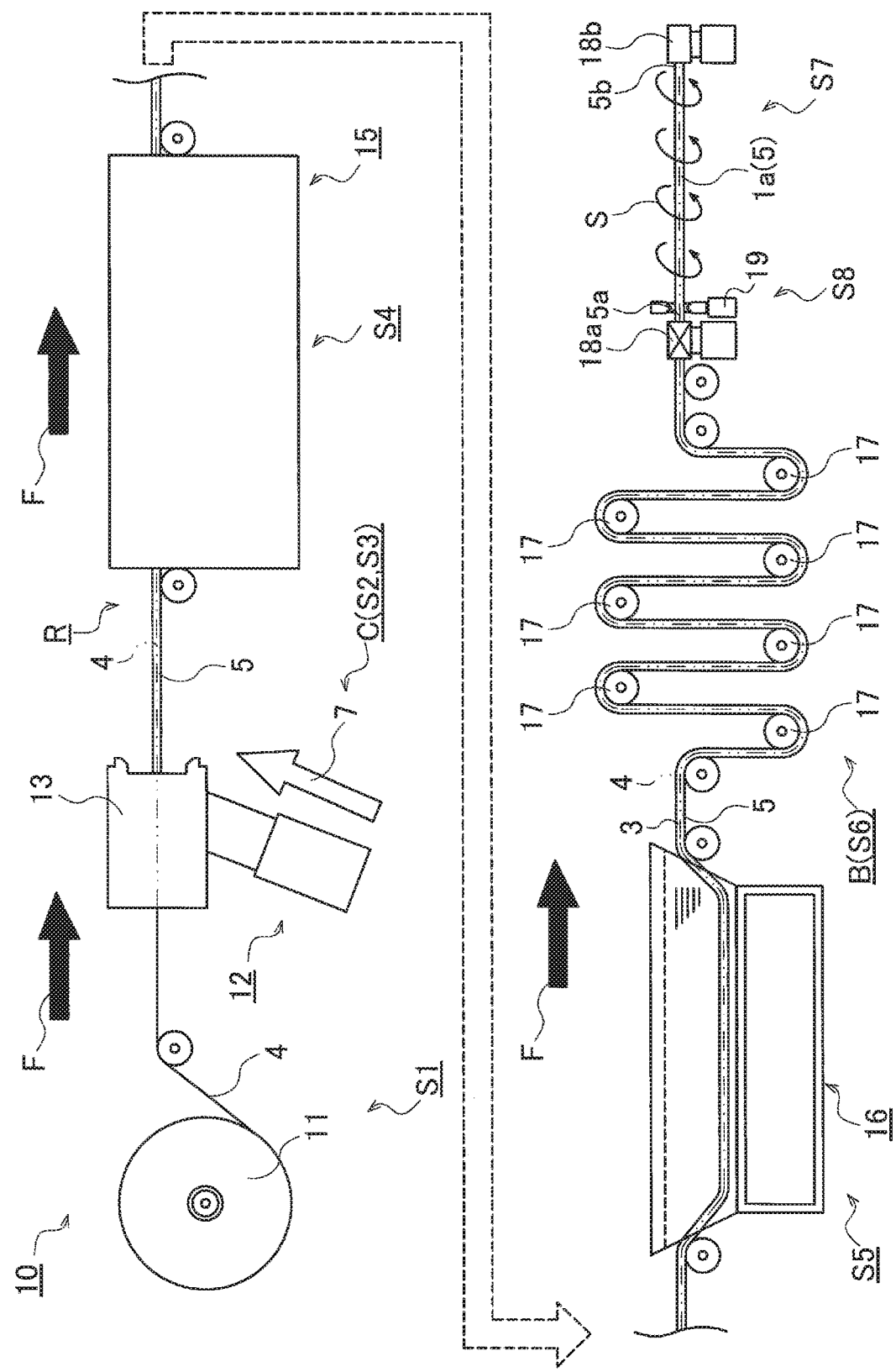
FIG. 6 is an explanatory diagram showing an example of the flow of a manufacturing method of the helical layer structure according to an embodiment, which uses a thermosetting elastic material as a polymeric material.

According to at least one embodiment, the coated intermediate 5 that has been subjected to the cooling step S5 is carried to the buffer area B where the next step, namely, the intermediate holding step S6 is carried out, and is temporarily held in the buffer area B. In the buffer area B, the coated intermediate 5, which has been subjected to the cooling step S5, is supported by a plurality of buffer rollers 17, thereby providing a time lag before the coated intermediate 5 is sent out to the helix formation step S7, as shown in FIG. 6. This makes it possible to secure a prolonged moving time for the coated intermediate 5.

There is no particular restriction on the intermediate holding step S6, insofar as a plurality of buffer rollers are arranged in an alternate manner as shown in FIG. 6 and a prolonged time for the passage through the buffer area B is secured. Thus, the coated intermediate 5 is held in an unseparated state before the twisting process, securing the processing time for the helix formation step S7. As a result, the helical layer structure 1 in accordance with at least one embodiment can be continuously formed.

In the intermediate holding step S6, which involves the buffer area B, the coated intermediate 5 held in the buffer area B is thereafter pulled out by a predetermined length and sent to the helix formation step S7. In the helix formation step S7, one end 5a on the downstream side of the coated intermediate 5 and the other end 5b on the upstream side thereof are chucked by locking sections 18a and 18b, which are capable of chucking the two ends.

After that, only the locking section 18b, which is chucking the other end 5b, is rotated about an axis that has the feeding direction F as the helix axis X, while keeping the locking section 18a, which is chucking the one end 5a, stationary (refer to a twisting direction S in FIG. 6).

Thus, the coated intermediate 5 can be twisted into the helical shape (the helix formation step S7). As a result, the uncut helical layer structure 1a, which is a layered structure having the two layers, namely, the helical core member 2 and the polymeric coating layer 3, is obtained. In this state, the coated intermediate 5 held in the buffer area B and the uncut helical layer structure 1a are still connected.

The pitch of the helix formed by the twisting process is not particularly restricted, and can be set to, for example, 150-mm intervals, in the manufacturing method 10 according to at least one embodiment. Further, a cutting unit 19 installed in the vicinity of the one end 5a on the downstream side is actuated to cut the uncut helical layer structure 1a, which has been twisted, off of the coated intermediate 5 in the buffer area B (post-twist cutting step S8). This completes the manufacture of the helical layer structure 1.

As described above, the manufacturing method 10 according to at least one embodiment enables the helical layer structure 1 to be manufactured by forming the coated intermediate 5 from the core member 4 and the polymeric material 7, and subjecting the coated intermediate 5 to the thermosetting treatment, the cooling step and the twisting process in succession, and lastly the cutting step. This permits a continuous manufacturing process without an interruption between individual steps, thus enabling higher efficiency of the manufacture of the helical layer structure 1 to be achieved.

The manufacturing method of a helical layer structure in accordance with at least one embodiment is not limited to the manufacturing method 10 according to the various embodiments described above. More specifically, in the manufacturing method 10 according to at least one embodiment, the description has been given of the post-twist cutting step S8 being carried out after the helix formation step S7; however, the order of the steps is not limited thereto. For example, a pre-twist cutting step (not shown) in which the coated intermediate 5 is cut to the predetermined length may be carried out after the cooling step S5.

In this case, the coated intermediate 5 after cutting is twisted using the foregoing unit (the helix formation step S7). In this case, there is no need for various types of equipment or arrangements, such as the buffer area B for temporarily holding the coated intermediate 5 and the plurality of buffer rollers 17 installed in the buffer area B, thus making it possible to prevent an increase in equipment cost and to achieve a reduction in the manufacturing space for manufacturing the helical layer structure 1.

According to at least one embodiment, the coated intermediate 5 must be cut off to a predetermined length before the twisting process; thus, the cutting unit 19 shown in FIG. 6 is required to be installed between the buffer area B (the buffer rollers 17) and the locking section 18a. The coated intermediate 5 which has been cut to the predetermined length and which is before being subjected to the twisting process is then placed and fixed between the locking section 18a and the locking section 18b and subjected to the helix formation step S7.

In the manufacturing method 10 according to at least one embodiment, the description has been given of the example in which ethylene-propylene rubber (EPDM) or the like, which is a thermosetting elastic material, is used as the polymeric material 7; however, the material for the polymeric material 7 is not limited thereto. The manufacturing method of a helical layer structure may alternatively use a thermoplastic styrene-based elastomer or a dynamically cross-linked thermoplastic elastomer or the like, which is a thermoplastic elastic material.

If a thermoplastic elastic material is used, then the polymeric material 7 having fluidity is required to be subjected to heating treatment at a temperature in the range of 150° C. to 270° C. in order to supply the polymeric material 7 from the supply unit 12. If the temperature is lower than 150° C., then the fluidity decreases, possibly preventing smooth supply of the polymeric material 7 and stable coating of the core member 4. On the other hand, if the temperature is higher than 270° C., then the thermoplastic elastic material itself may decompose. Therefore, the temperature must be set within the foregoing numerical range.

Further, if a thermoplastic elastic material is used, then the thermosetting step S4 carried out after the coating step S3 will be unnecessary in the manufacturing method 10 according to at least one embodiment. More specifically, if a thermoplastic elastic material (elastomer) is used, then there will be no need for the thermosetting treatment required for a thermosetting elastic material (rubber). After the polymeric material 7 is coated on the core member 4, the core member 4 can be directly sent to a cooling tank 16 to cool the core member 4.

After the cooling step S5, the coated intermediate 5 may be temporarily held in the buffer area B and cut after the helical twisting process as described above, or may be cut to a predetermined length after being subjected to the cooling step S5, and then subjected to the helical twisting process.

As described above, according to the manufacturing method 10 according to at least one embodiment, the polymeric material 7 is brought into contact with the core member 4, which is shaped like a lengthy flat plate, to form the polymeric coating layer 3, and then the helix formation step S7 for the helical twisting is carried out. This leads to better workability, as compared with the case where the polymeric material 7 is brought into contact with the helical core member 2, which is formed by helically forming the core member 4, so as to form the polymeric coating layer 3.

In particular, the polymeric coating layer 3 is formed using the polymeric material 7 having the elasticity, so that the twisting process carried out after the polymeric coating layer 3 is formed will not cause the surface or the like of the polymeric coating layer 3 to develop a crack, a cleavages or the like, thus enabling successful manufacture of the helical layer structure 1.

INDUSTRIAL APPLICABILITY

The helical layer structure in accordance with at least one embodiment can be used for conventional ornamental applications and for foundation reinforcement, and can be also used as a part of a rectification member for rectifying fluid, such as cold air or hot air, that passes through a pipe, by being installed in the pipe of an in-car air conditioner, for which especially high operating efficiency, durability and the like are required, by making use of the helical form and the layered structure of the polymeric coating layer 3. In addition, the helical layer structure can be also used as a part of a heat exchanging member by making use of the large surface area per unit volume.

DESCRIPTION OF REFERENCE NUMERALS

1: Helical layer structure; 1a: Uncut helical layer structure; 2: Helical core member; 2a, 4a: Core member front surface; 2b, 4b: Core member back surface; 4c: Core member side surface; 3: Polymeric coating layer; 4: Core member; 5: Coated intermediate; 5a: One end; 5b: Other end; 6, 6a, 6b, 6c: Slit; 6d: Punched part (Slit); 7: Polymeric material; 10: Manufacturing method of the helical layer structure; 11: Rolled body; 12: Supply unit; 13: Coating head; 14: Die; 15: Thermosetting unit; 16: Cooling tank; 17: Buffer roller; 18a, 18b: Locking section; 19: Cutting unit; B: Buffer area; C: Coating area; F: Feeding direction; H: Layer thickness; R: Feeding route; S: Twisting direction; T: Core member thickness; X: Helix axis; W: Core member width; S1: Feeding step; S2: Supply step; S3: Coating step; S4: Thermosetting step; S5: Cooling step; S6: Intermediate holding step; S7: Helix formation step; and S8: Post-twist cutting step.

What is claimed is:

1. A helical layer structure, comprising:
    a helical core member which is formed of a flexible, lengthy, flat plate-like core member twisted to form a helical shape, the longitudinal direction of the core member being a helix axis; and
    a polymeric coating layer which is formed of a polymeric material which covers and conforms to the entire surface of the helical core member forming a corresponding helical shape,
    wherein the polymeric material that constitutes the polymeric coating layer is a thermosetting elastic material which is any one of ethylene-propylene rubber, styrene-butadiene rubber, nitrile rubber, silicone rubber, acrylic rubber, and hydrogenated nitrile rubber, and
    wherein the polymeric coating layer has Shore A hardness ranging from 35 to 50.

2. The helical layer structure according to claim 1, wherein the helical core member is a steel plate formed of a metal material which is any one of iron, stainless steel and aluminum.

3. The helical layer structure according to claim 1, wherein the helical core member has at least one of a slit that passes through a core member front surface and a core member back surface of the core member and a slit formed by cutting out a part of the core member.

4. The helical layer structure according to claim 1, wherein the core member thickness of the helical core member or the core member ranges from 0.25 mm to 3.00 mm, and the core member width of the helical core member or the core member ranges from 3 mm to 150 mm.

5. The helical layer structure according to claim 1, wherein the layer thickness of the polymeric coating layer ranges from 0.3 mm to 10 mm.

6. A manufacturing method of the helical layer structure described in claim 1, comprising:
    a feeding step of feeding a flexible, lengthy, flat plate-like core member along the longitudinal direction of the core member;
    a supply step of supplying a polymeric material having fluidity to a coating area provided in the middle of a feeding route of the core member;
    a coating step of bringing the polymeric material supplied in the supply step into contact with the core member to coat the core member with the polymeric material in the coating area;
    a cooling step of cooling a coated intermediate which is the core member coated with the polymeric material; and
    a helix formation step of helically twisting the coated intermediate, the longitudinal direction of the coated intermediate that has passed through the cooling step being a helix axis, to form a helical layer structure.

7. The manufacturing method of a helical layer structure according to claim 6, further comprising:
    an intermediate holding step which is carried out between the cooling step and the helix formation step to temporarily hold, in a buffer area, the coated intermediate that has passed through the cooling step; and
    an after-twist cutting step of cutting an uncut helical layer structure that has passed through the helix formation step to a predetermined length,
    wherein the helix formation step helically twists the coated intermediate before the coated intermediate is cut to a predetermined length.

8. The manufacturing method of a helical layer structure according to claim 6, further comprising:
    a pre-mist cutting step which is carried out between the cooling step and the helix formation step to cut the coated intermediate that has passed through the cooling step to a predetermined length,
    wherein the helix formation step helically twists the coated intermediate that has been cut to a predetermined length.

9. The manufacturing method of a helical layer structure according to claim 6, further comprising:
    a thermosetting step which is carried out between the coating step and the cooling step to heat the coated intermediate thereby to thermally cure the polymeric material coated on the core member.

10. The manufacturing method of a helical layer structure according to claim 9, wherein the supply step supplies the polymeric material which is subjected to a heating treatment at a temperature in the range of 30° C. to 120° C. to develop fluidity, and the thermosetting step performs a thermosetting treatment at a thermosetting temperature in the range of 150° C. to 250° C. for a thermosetting time of 120 s to 600 s.

* * * * *